(12) United States Patent
Cunningham et al.

(10) Patent No.: US 6,609,834 B2
(45) Date of Patent: Aug. 26, 2003

(54) MULTIMODE COMMUNICATIONS SYSTEMS

(75) Inventors: David George Cunningham, Wickwar (GB); Mark Charles Nowell, Bath (GB); Robert William Musk, Ashbocking (GB); Alistair Neil Coles, Bath (GB)

(73) Assignee: Agilent Technologies, Inc., Palo Alto, CA (US)

( * ) Notice: Subject to any disclaimer, the term of this patent is extended or adjusted under 35 U.S.C. 154(b) by 147 days.

(21) Appl. No.: 09/932,911

(22) Filed: Aug. 20, 2001

(65) Prior Publication Data

US 2002/0021469 A1 Feb. 21, 2002

Related U.S. Application Data

(62) Division of application No. 09/076,644, filed on May 12, 1998, now Pat. No. 6,304,352.

(30) Foreign Application Priority Data

May 13, 1997 (GB) .............................................. 9709627

(51) Int. Cl.$^7$ ................................................. G02B 6/38
(52) U.S. Cl. ...................... 385/60; 385/89; 398/139; 398/143; 398/144; 398/164
(58) Field of Search ............................... 359/152, 163; 385/60, 72, 78, 88–89

(56) References Cited

U.S. PATENT DOCUMENTS

| | | | |
|---|---|---|---|
| 4,705,350 A | 11/1987 | Cheng | 350/96.16 |
| 4,778,239 A | 10/1988 | Shaw et al. | 350/96.16 |
| 4,928,319 A | 5/1990 | Pitt et al. | 455/612 |
| 5,600,470 A | 2/1997 | Walsh | 359/152 |
| 5,943,461 A * | 8/1999 | Shahid | 385/92 |
| 6,061,159 A | 5/2000 | Walsh | 359/152 |
| 6,094,532 A | 7/2000 | Acton et al. | 395/800.28 |
| 6,454,464 B1 * | 9/2002 | Nolan | 385/60 |

FOREIGN PATENT DOCUMENTS

EP  0 361 498 A3  4/1990

OTHER PUBLICATIONS

European Patent Office: Patent Abstracts of Japan; Pub. No. 60075137, Published on Apr. 27, 1985; Japanese Application No. 58183569, Filed Sept. 30, 1983.

International Search Report of International Application No. PCT/GB98/01359.

* cited by examiner

Primary Examiner—Kinfe-Michael Negash

(57) ABSTRACT

A method and apparatus is provided for connecting an optical source to a multimode optical fibre in a multimode optical fibre communications system. A single mode fibre length is provided such that optical radiation admitted from an optical source at one end of the single mode fibre length is provided to a multimode optical fibre at the other end of the single mode fibre length. This method and apparatus is used in a duplex patchcord for connecting an optical transceiver to a pair of installed multimode fibres. The second fibre in the patchcord is a multimode fibre for passing optical signals to the optical receiver of the transceiver.

2 Claims, 8 Drawing Sheets x = 0.50 thousandths of inch (12.7μm) x/R=0.4064

500ps/div
500mV/div

4ns/div
500mV/div x = 0.75 thousandths of inch (19.06μm) x/R=0.6096

500ps/div
200mV/div

4ns/div
500mV/div x = 1.0 thousandths of inch (25.41μm) x/R=0.8132

4ns/div
100mV/div

US 6,609,834 B2

MULTIMODE COMMUNICATIONS SYSTEMS

This application is a division of U.S. patent application Ser. No. 09/076,644, now U.S. Pat. No. 6,304,352, filed on May 12, 1998.

BACKGROUND OF THE INVENTION

1. Field of the Invention

The present invention relates to methods and apparatus for improving the performance of multimode optical fibre communications systems, and in particular to methods and apparatus for use in connecting optical transceivers to multimode fibres.

2. History of the Prior Art

In the late 1970s, and early 1980s, much work was carried out to improve performance of multimode optical fibre communications systems. However, when multimode fibre was replaced by a singlemode fibre, as the medium of choice for use in high bit rate, long distance communications systems, much of this work ceased. Multimode fibre has continued to be used in optical communications for systems operating at lower bit rates, and over shorter distances, for example in building or campus LANs. Such multimode fibres are predominantly used in the LAN backbone but may also be used in horizontal links to users and appliances. There is thus a large installed base of multimode fibre, which represents a significant investment.

In recent years the demand for high data rate LANs has increased dramatically, for example to 1 GBit/s and beyond. The required data rates cannot be achieved utilising conventional techniques with LANs containing significant multimode fibre, even when the lengths of fibre are relatively short (500 meters).

A key aspect in determining the bandwidth of a multimode optical fibre communications link, which has been recognised for many years, is the number and distribution of modes within the multimode fibre which are excited, and therefore carry optical energy. See for example Chapter 7 of "Optical Fibres for Transmission" by John E. Midwinter, published by John Wiley & Sons in 1979. If a pure low order single mode is launched into a multimode fibre, and there is no mode mixing, the bandwidth and other characteristics of the optical communication link will be that of a single-mode fibre, i.e. the link will have high bandwidth. If mode mixing occurs, for example due to fibre profile irregularities, or mechanical perturbations of the fibre, energy will be coupled from the single lowest order mode into higher order modes having higher group velocities, and additional pulse dispersion will inevitably result, leading to a lower overall bandwidth for the communications system. Alternatively, if light is launched into the same multimode fibre in a manner so as to uniformally excite all modes of the multimode fibre, and if no mode mixing occurs, a maximum pulse spread will be seen, and the bandwidth of the communications system will be at a minimum. If mode mixing is introduced to this situation, because individual photo ns will then spend some time in many different modes, and will have travelled many short distances at different group velocities, less pulse spreading will be experienced. In the ideal case rather than experiencing an increase of pulse spreading which is proportional to the length of the optical communications link, pulse spreading builds up only in proportion of the square root of the length of the optical communications link. Thus, in the early 1980s, although various alternative schemes were investigated (see eg U.S. Pat. No. 4,050,782 and U.S Pat. No 4,067,642), it was generally accepted that it was desirable to launch many modes into a multimode optical fibre, and to ensure that adequate mode mixing occurred in order to achieve a reasonable, and predictable, bandwidth for an optical communications link.

Despite this practical approach, it was however theoretically predicted that if the number and distribution of modes excited within a multimode fibre could be precisely controlled, the bandwidth of the communications link could be improved. For example, see Section 7.6, page 126 of Midwinter's book where it is suggested that controlled mode coupling can be utilised to prevent coupling to the highest order modes of the fibre so as to increase the fibre bandwidth without incurring a loss penalty. Nevertheless, it is stated here that "It must be said, however that experimentally it looks extremely difficult to achieve such a precisely controlled fibre environment, and at the time of writing no reports of experimental testing are known."

In recent years lasers rather than LEDs (Light Emitting Diodes) have been utilised with multimode optical fibre communications systems. There are a number of reasons for this, of which the predominant one is that lasers can be directly modulated at higher speeds than LEDs. In contrast to LEDs, lasers can easily be utilised to excite only a few, low order modes of the multimode optical fibre. As discussed above, if only a few modes of a multimode fibre are excited, and little mode mixing occurs, the bandwidth of a multimode optical fibre communications system can in principle be increased somewhat. For example, data rates up to 1 GBit/s have been achieved over a maximum of 200 meters using a 780 $\mu$m laser diode and 62.5 $\mu$m multimode fibre.

There are significant differences between use of an LED and use of a laser in launch of a signal into multimode fibre. Characteristically, an LED launch will be an overfilled launch and hence will cause the modes of the multimode fibre to be fully populated. Bandwidth of multimode fibre is characterised according to its performance for such a launch. However, as indicated above, a laser does not have an overfilled launch—instead, there will be a a restricted launch in which only certain of the fibre modes will be partially populated or largely unpopulated. The nature of the restriction of the launch is dependent on a number of factors— lower numerical aperture of the laser than the multimode fibre, smaller spot size than core diameter, nature of the laser source and coupling arrangement (constituents of the coupling mechanism such as lenses, fibre stubs etc.).

The present inventors have found that restricted launch into a multimode fibre can have a serious effect on the bandwidth achievable with the fibre, even where the bandwidth of the fibre is nominally in specification according to the overfilled launch bandwidth. The particular difficulty found is that the bandwidth exhibited by a fibre is strongly dependent on the details of the restricted launch. The actual bandwidth achieved can be significantly higher than the overfilled launch bandwidth—it can also be significantly lower. This creates a serious problem for system designers, as it is thus not possible to guarantee what minimum bandwidth will be encountered.

BRIEF SUMMARY OF THE INVENTION

Accordingly, in a first aspect the invention provides apparatus for connecting an optical transceiver to multimode optical fibre in a multimode optical fibre communications system, the apparatus comprising: a transmission part adapted for receiving outgoing optical radiation admitted to the apparatus from an optical source of the optical transceiver at a radiation input into a single mode optical fibre of the transmission part and adapted for transmitting said outgoing radiation out into a first multimode optical fibre of the multimode optical fibre communications system after passage through the single mode optical fibre, and; a reception part adapted for receiving incoming optical radiation admitted to the apparatus from a second multimode optical fibre of the communications system into a multimode optical fibre of the reception part and adapted for transmitting said incoming radiation into a receiver of the optical transceiver.

This arrangement can be used very effectively to provide launching of light into multimode fibre with satisfactory bandwidth results. There are a number of advantageous possibilities with this arrangement. A particularly advantageous arrangement is for the length of single mode fibre to be sufficiently long that the light emitted from the fibre will be substantially single mode light. This approach solves the problem of reliable bandwidth assessment indicated above, because the launch of a single mode of radiation from a single mode fibre into a multimode fibre is well understood, and will guarantee that at least the overfilled launch bandwidth of the multimode fibre will be achieved on a consistent basis. Experimental results relating to launching of a single mode into a multimode fibre are discussed in "A Mode-Filtering Scheme for Improvement of the Bandwidth-Distance Product in Multimode Fiber Systems", Haas, Z. and Santoro, M. A., Journal of Lightwave Technology, Vol. 11, No. 7, July 1993. It is however necessary that the optical radiation is provided as substantially a single mode. Prior art transmitter structures are known incorporating a "fibre stub" of fibre, which may be single mode, after the laser (e.g. U.S. Pat. No. 5,315,680). These provide eye safety in the event of removal of a connector while the laser is functioning, as much light from other modes is stripped away by the cladding of the fibre stub, thus reducing the light emitted from the structure to safe levels. However, although these arrangements serve to remove significant amounts of the light from other modes, much too short a length of fibre is provided to limit the light emitted to substantially only single mode optical radiation—these arrangements hence do not solve the bandwidth problem solved by the present invention.

In certain embodiments, the apparatus comprises only a single mode fibre for launching light into the multimode fibre system. This may be achieved by a normal centre launch, but advantageously a mode conditioning means is provided in the transmission part such that chosen modes of the multimode fibre will be preferentially excited by the outgoing radiation so as to increase the operational bandwidth of the first multimode optical fibre of the communications system. This can be achieved where the apparatus has only a single mode fibre for launching light into the multimode fibre system by launching the outgoing radiation from the single mode fibre into the multimode fibre, such that the outgoing radiation illuminates an end face of the multimode fibre away from the axis of the multimode fibre.

In an alternative embodiment, the mode conditioning means is achieved by using a further multimode fibre together in the apparatus with the single mode fibre, such that light passes into the single mode fibre, into the further multimode fibre through the connecting means, and out into the first multimode fibre of the multimode fibre communications system. Accordingly, a reliable and effective launch into multimode fibre can be achieved.

It is advantageous if the multimode fibre length of the apparatus (for providing light to the receiver) has a core size greater than or equal to the core size of the second multimode fibre of the multimode fibre system. With this arrangement, light from the second multimode fibre does not have to make a transition to a smaller diameter fibre, which would give rise to both loss and modal noise.

This apparatus is advantageously embodied in a patchcord, although a dongle (with coiled fibres) is an alternative. Preferably, appropriate keying or other means is provided to ensure correct connection between optical source or receiver and the corresponding multimode fibre through the appropriate fibre length. As is discussed below, considerable technical and practical advantages are provided where the apparatus is in the form of a duplex patchcord comprising the single mode fibre length and the multimode fibre length. In practical s systems, a patchcord of some form will often be required in any event for connection between an optical transceiver and the installed fibres of an optical fibre communication system. Employing a patchcord in accordance with the invention for this purpose causes no change in practice for the user, but achieves a solution to the minimum bandwidth guarantee problem discussed above.

In a further aspect, the invention provides a communications device for use in an multimode fibre optical communications system, comprising an optical transceiver and an apparatus as indicated above. In a still further aspect, the invention provides a communications system comprising an optical transceiver and first and second multimode optical fibres for receiving outgoing optical radiation from and supplying incoming optical radiation to the optical transceiver respectively, the optical transceiver and the first and second multimode optical fibres being connected by a connecting apparatus, the connecting apparatus being an apparatus as described above.

In a yet further aspect, the invention provides a method of constructing a connection apparatus for connecting an optical transceiver to multimode optical fibre in a multimode optical fibre system, comprising: providing a length of single mode fibre terminating in a first ferrule, and providing a length of multimode fibre terminating in a second ferrule, wherein the wherein the second ferrule and the first ferrule are coaxial, wherein the single mode fibre and the multimode fibre are each mounted within the first ferrule and the second ferrule respectively such that the axis of each fibre is offset from the axis of the ferrule; rotating the first ferrule with respect to the second ferrule such that the single mode fibre is offset from the launch multimode fibre, measuring an output property of light from the multimode fibre, and fixing the first ferrule with respect to the second ferrule when a satisfactory value of the output property is achieved; providing a further length of multimode fibre, and adding connectors to the fibres, such that a first fibre path comprising the length of single mode fibre and the length of multimode fibre is formed for connection between a source of an optical transceiver and a first fibre of a multimode fibre network, and such that a second fibre path comprising the further length of multimode fibre is formed for connection between a receiver of the optical transceiver and a second fibre of the multimode fibre network.

In one further aspect, the invention provides a method for connecting an optical transceiver to multimode optical fibre in a multimode optical fibre communications system, comprising connecting the optical transceiver to first and second multimode optical fibres of the multimode optical fibre communications system with a connecting apparatus comprising a transmission part adapted for receiving outgoing optical radiation admitted to the apparatus from an optical source of the optical transceiver at a radiation input into a single mode optical fibre of the transmission part and adapted for transmitting said outgoing radiation out into a first multimode optical fibre of the multimode optical fibre communications system after passage through the single mode optical fibre and a reception part adapted for receiving incoming optical radiation admitted to the apparatus from a second multimode optical fibre of the communications system into a multimode optical fibre of the reception part and adapted for transmitting said incoming radiation into a receiver of the optical transceiver, wherein outgoing radiation is transmitted from an optical source of the optical transceiver through the transmission part of the connecting apparatus to a first multimode fibre of the multimode optical fibre communications system, and incoming radiation is transmitted from a second multimode optical fibre of the multimode optical fibre communications system through the reception part of the connecting apparatus to an optical receiver of the optical transceiver.

BRIEF DESCRIPTION OF THE DRAWINGS

Specific embodiments of the invention are described below, by way of example, with reference to the accompanying drawings, of which.

DETAILED DESCRIPTION

Figure 1:
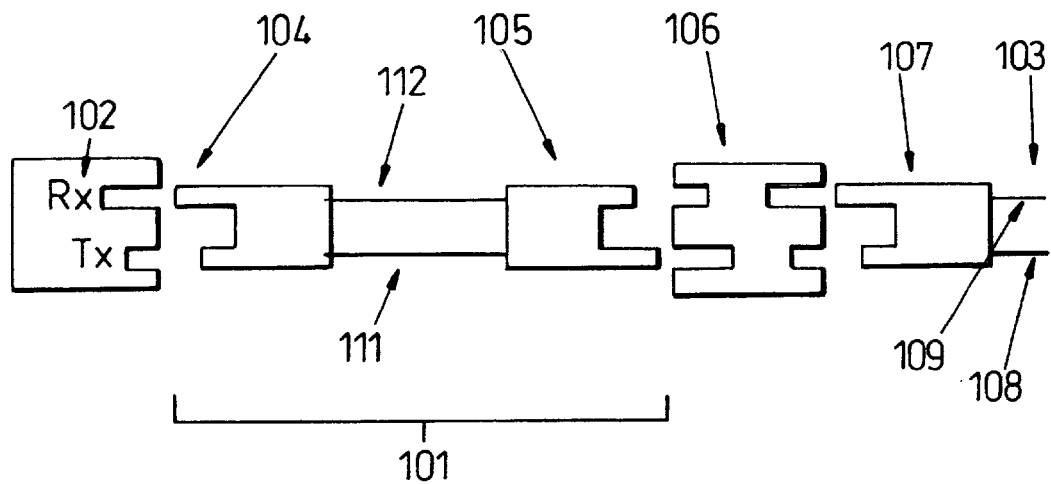
FIG. 1 shows a schematic block diagram showing an optical assembly connecting a transceiver to an installed fibre of an optical communications system, all according to an arrangement in accordance with an embodiment of the present invention.

FIG. 1 shows a first embodiment of the invention. This embodiment comprises an optical assembly 101 in the form of a patchcord to provide connection between a transceiver 102 and preexisting (installed) multimode fibre 103. The patchcord is a duplex arrangement with two parts: a transmission part adapted for receiving radiation from the transceiver and providing it to the multimode optical fibre communications system (generally an installed base of multimode fibre), and a reception part for receiving optical radiation from the multimode optical fibre communications system. The transmission part and the reception part have respectively their own optical fibres—a single mode fibre 111 for connection between the optical source of the transceiver 102 and a first installed multimode fibre 108, and a multimode fibre 112 for connection between the optical receiver of the transceiver 102 and the second installed multimode fibre 109. In this embodiment, the length of fibre in the patchcord is sufficiently great that essentially all the signal outside the single mode of the fibre is stripped away by the cladding, such that essentially single mode optical radiation is provided for launch into the first multimode fibre 108. The degree to which vestiges of radiation at other modes may remain is a matter which can readily be determined by the skiled man—the key criterion to be achieved is that at least the overfilled launch bandwidth is reliably achieved.

The second optical fibre of the patchcord is a multimode fibre 112 for receiving optical radiation from the second installed multimode fibre 109 and conveying it to the receiver of the optical transceiver 102. Preferably, this multimode fibre 112 win be of a simar type to the installed fibre 109 (for example, both would be graded index fibres with a 50 $\mu$m core or a 62.5 $\mu$m core). However, this is not essential. It is however important that the core of the multimode fibre 112 in the patchcord is of at least the diameter of the installed multimode fibre 109—otherwise, there will be loss of signal on coupling and also modal noise. The core of the multimode fibre 112 in the patchcord should not be larger than the receiver size or, again, signal will be lost.

Figure 2:
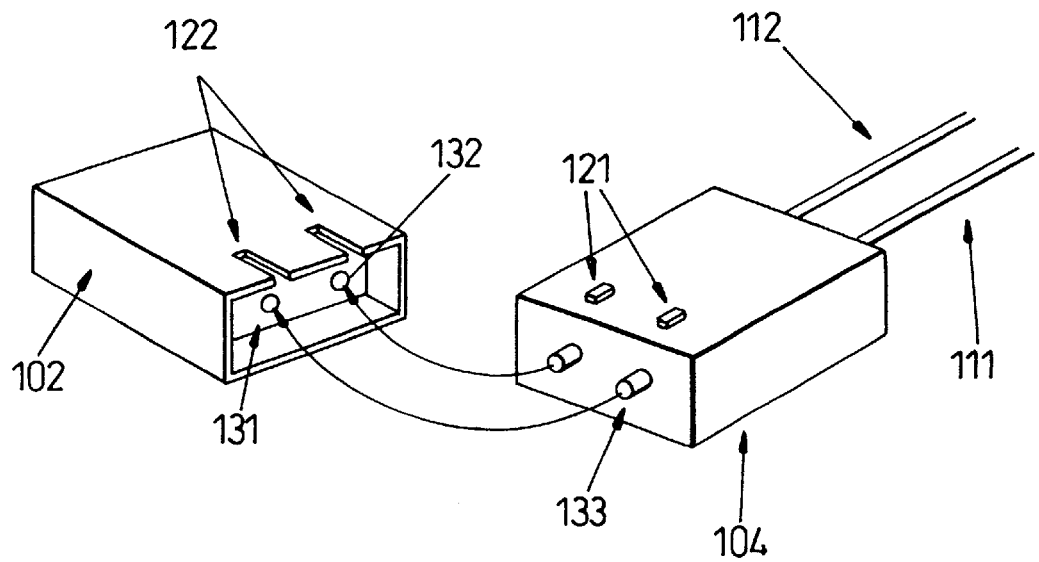
FIG. 2 shows a schematic diagram of a transceiver to optical assembly connection for the arrangement of FIG. 1.

The patchcord terminates at either end with a keyed connector 104,105. The connector may be of any conventional form for fibre-to-fibre connection. A duplex SC connector is an appropriate form of connector for this purpose, though alternative connector types, such as MT, can also be used. Keying is provided to ensure that light passes from optical source 131 to first installed fibre and from second installed fibre to optical receiver 132 through the correct fibres of the patchcord: so the light from optical source 131 enters radiation input 133 of the single mode fibre 111, for example. The keying structure as illustrated in FIG. 2, comprising two keys 121 slotting into two key channels 122, ensures that only the one correct connection between patchcord and transceiver can be made. A similar connection (not shown) is made between the patchcord and the installed fibres. In this case, it is advantageous to provide an appropriate adaptor 106, as it is most convenient to terminate both the patchcord and the installed fibres in essentially similar keyed connectors. The adaptor 106 contains only means for aligning the patchcord fibres with the respective installed fibres: it does not contain any optical path element itself.

The optical source 131 and optical receiver 132 in the transceiver may be of any type appropriate to this form of communications system. Typically, to achieve the very high bit rates desired, the transmitter is a semiconductor diode laser. The receiver is typically a p-i-n photodiode. Appropriate lasers and photodiodes for use in this type of communications system are discussed extensively in the literature of this field, and will not be discussed further here—the man skilled in the art could readily choose an optical source and optical receiver appropriate to this use.

While the optical assembly for connecting the transceiver and the installed multimode fibre is provided here as a patchcord, other forms are quite as possible and may be advantageous in specific contexts. The assembly could be provided as a dongle, with the lengths of single mode and multimode fibre coiled within: other appropriate forms of assembly could readily be envisaged by the skilled man.

In the first embodiment, the stripping of modes to achieve the overfilled launch condition is achieved by having a sufficient length of single mode fibre. Specific approaches to launching light into multimode fibre from single mode fibre are known which can assist in preventing bandwidth collapse. A second embodiment of the invention exploits this knowledge by controlling the launch from the single mode fibre into the installed multimode fibre appropriately. In this second embodiment, an offset launch from single mode fibre into the installed multimode fibre is employed, using the approach described in International Patent Application PCT/GB 97/00647 (Publication No. 97/33390), an application which designates the United States of America and of which the U.S. National Part was filed on Nov. 6, 1997 with Ser. No. 08/945,993, the content of which application is incorporated by reference into the present application. The basis of this approach is described briefly below—it is described in greater detail in the aforementioned application.

Figure 3:
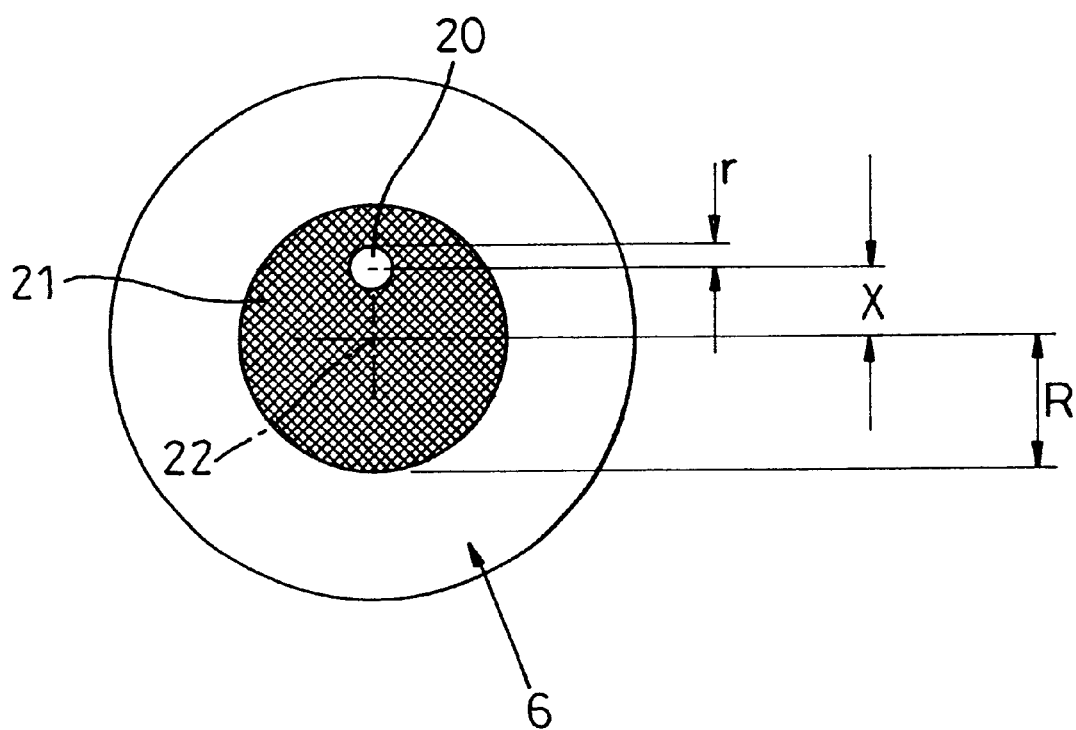
FIG. 3 shows a spot illuminating a multimode fibre core to achieve an offset launch.

The geometry of the offset launch arrangement is shown in FIG. 3. An illuminating spot 20 is offset a distance X from the optical axis 22 of a multimode optical fibre 6. The illuminated spot 20 has a radius r and the multimode fibre 6 has a core 21 of radius R.

Figure 4:
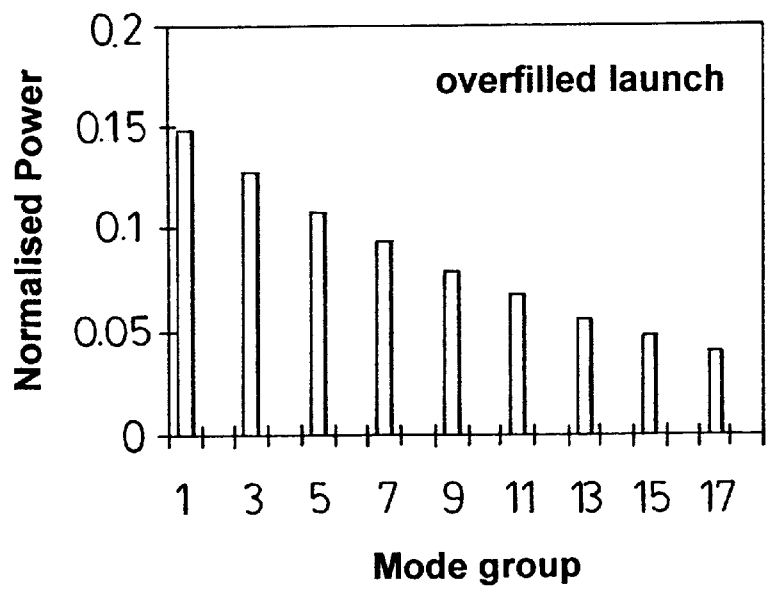
FIG. 4 is a theoretical plot of the normalised mode excitation spectrum for a multimode fibre when excited by an overfilled launch.
Figure 5:
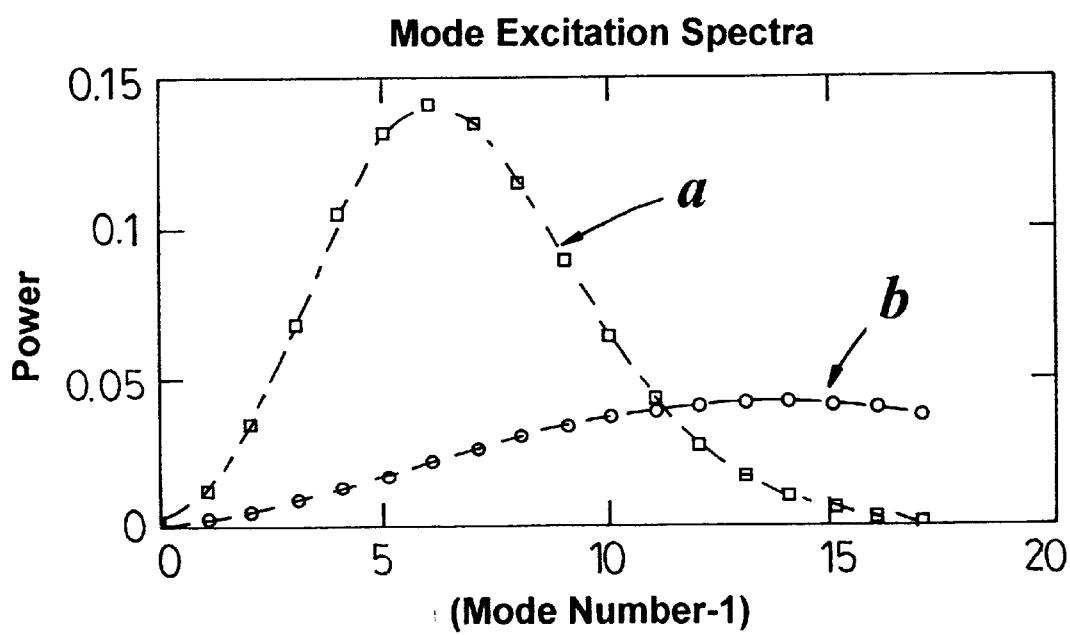
FIG. 5 shows theoretical plots of the normalised mode excitation spectrum for a multimode fibre when excited respectively by an offset launch (a) and by an angled launch (b)

FIG. 4 and 5 are theoretical plots of the normalised mode excitation spectra for an overfilled launch (FIG. 4), an offset launch (FIG. 5: $a$), and an angled launch FIG. 5: $b$) into a multimode fibre. An angled launch (described in U.S. Pat. No. 5,416,862) is one in which a multimode fibre is illuminated with a light beam at an angle to the fibre axis in order to excite higher order modes of the fibre. The multimode fibre is modelled to have a core of 62.5 $\mu$m diameter and a cladding of 125 $\mu$m diameter and the operating wavelength is 1300 nm. For the offset launch the illuminating spot is of radius 5 $\mu$m (standard for singlemode fibre at 1300 nm) and is offset a distance X=18, $\mu$m from the multimode fibre axis 22. The angled launch has been optimised as far as is possible. As can be seen from these figures, the mode excitation spectra of these three types of launch are very different. The OFL shows the expected excitation of a large number of modes including the strong excitation of lower order modes. The angled launch shows strong excitation of the higher order modes and very little excitation of the lower order modes. Furthermore the mode excitation profile is relatively flat. The offset launch in contrast shows the strong excitation of a small mid order group of modes that is believed to lead to high bandwidth and good modal noise performance. A centre launch would excite only the first or perhaps first and second order modes.

Figure 6:
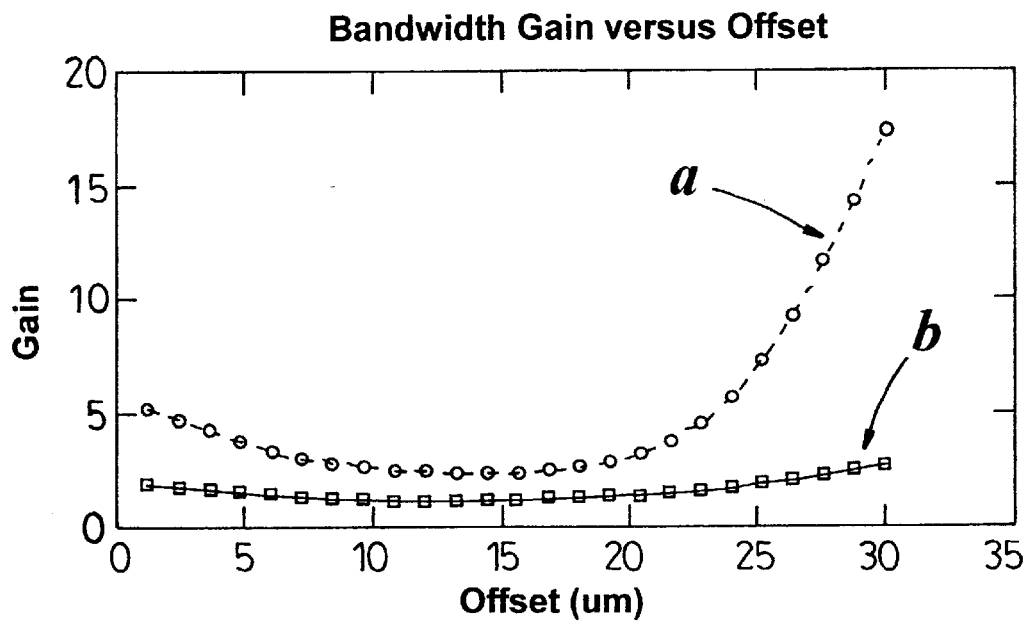
FIG. 6 shows theoretical plots of the bandwidth gain, compared to an overfilled launch, respectively of an offset launch (a) and an angled launch (b) for various offsets and angles.

FIG. 6 shows the bandwidth gain for the angled launch (FIG. 6: $b$) and the offset launch (FIG. 6: $a$) of FIG. 5. The bandwidth gain is calculated as a multiple of the bandwidth for an OFL. Both launches show increased bandwidth compared to OFL but the offset launch has a significantly greater bandwidth improvement.

Figure 12:
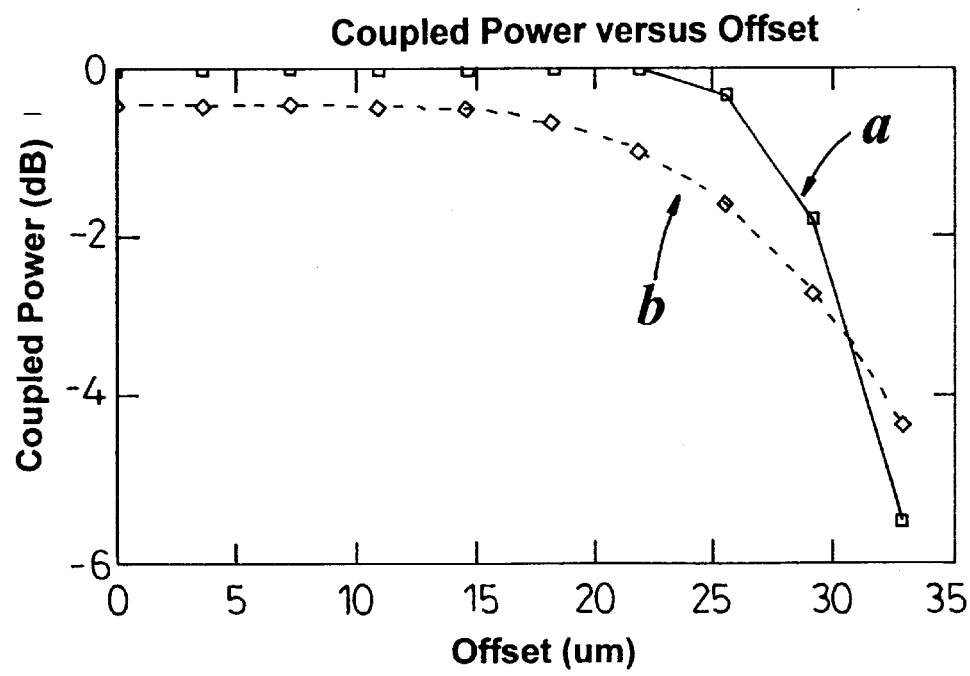
FIG. 12 shows respectively theoretical plots of the power coupled into a multimode fibre from an offset launch (a) and an angled launch (b) for various offsets and angles.
Figure 7A:
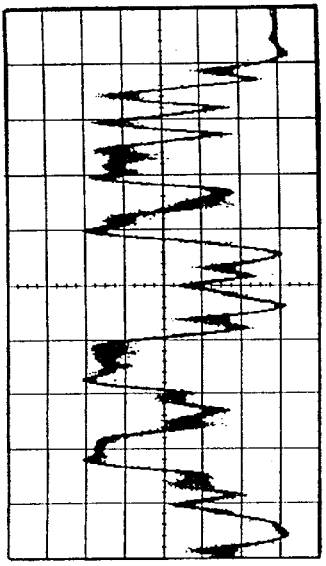
FIGS. 7a to 7e show experimental results for offset launch from a single mode fibre into a multimode fibre.
Figure 7B:
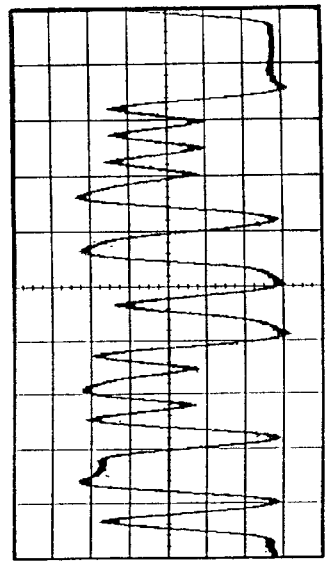
Figure 7C:
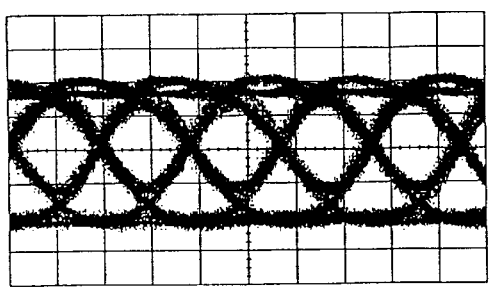
Figure 7C:
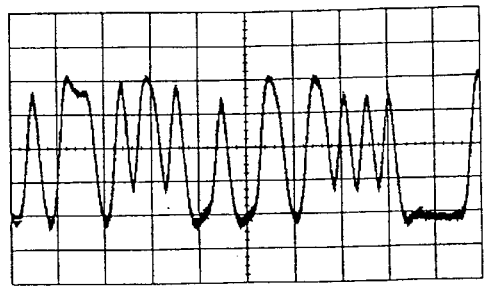
Figure 7D:
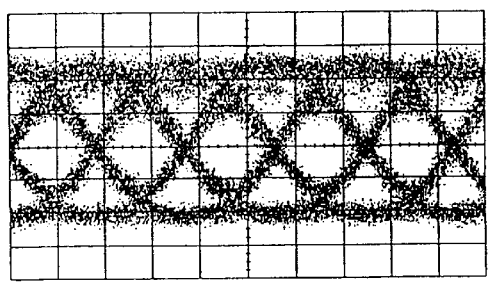
Figure 7D:
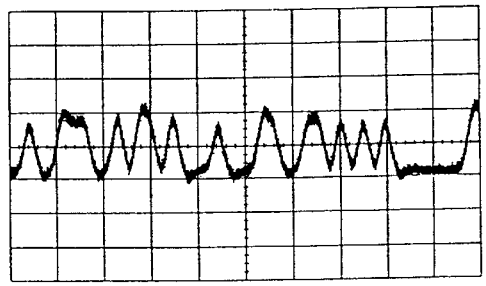
Figure 7E:
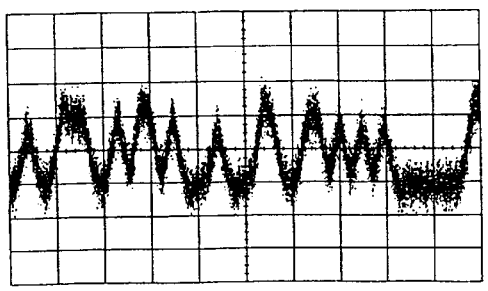

FIG. 12 is a graph of the power coupled to the multimode fibre from the singlemode launch fibre for the angled launch (FIG. 12: $b$) and the offset launch (FIG. 12: $a$). From FIGS. 6 and 12 it can be seen that for these particular operating conditions there is a range of offsets from between 15 and 25 $\mu$m which give both high bandwidth gain and low loss for the offset launch. However, for the angled launch in order to achieve significant bandwidth gains an operating range of high coupling loss must be entered. Angles have been converted to equivalent offsets for the angled launch in FIGS. 6 and 12 in order to compare the two launch techniques. It can be seen from FIGS. 6 and 12 that there is a wide range of offsets that achieve these advantages and thus that, compared to a centre launch, significantly lower tolerances are required.

Experimental results for offset launch are shown in FIGS. 7a to 7e. Light was launched from a 1300 nm Fabry Perot laser, coupled to a singlemode, 9 $\mu$m diameter, fibre pigtail according to a generated data pattern. The singlemode fibre pigtail was butt coupled to 2.2 km of 62.5/125 $\mu$m multimode fibre. The remote end of the multimode optical fibre was connected to an optical receiver, the output of which was directed to clock and data recovery cirruits for recovery of the data pattern, which was then passed to a sampling oscilloscope. The centre of the singlemode fibre core was offset axially from the centre of the multimode fibre core by a distance x. The multimode optical fibre was standard graded index fibre, having a parabolic refractive index, and complying with ISO/IEC 793-2. The manufacturer's data for the bandwidth of this fibre (measured with an LED) is 500 MHz.km at 1.3 $\mu$m and 20° C. Thus this should limit transmission at 1 GBit/s to a length of 1 km at best, and more likely to 700 m when using conventional launch techniques. FIGS. 7a to 7e show the data patterns and eye diagrams recorded at the sampling oscilloscope for various offsets x between the singlemode fibre axis and the multimode fibre axis. From FIG. 11a it can be seen that for a conventional, on axis launch the eye diagram is indeed almost closed, after transmission through 2.2 km of multimode fibre, and the data pattern shows significant distortion. When the singlemode fibre is offset from the axis of the multimode fibre 6 by 6.35 $\mu$m (corresponding to a ratio between the offset x and the multimode fibre core radius R of 0.2), it can be seen from FIG. 11b that the eye diagram has opened and the data pattern shows less distortion. From FIG. 11c, with an x/R ratio of 0.4 the eye diagram is almost fully open. At an $^x$/R ratio of 0.6 the eye diagram is still open, but significant noise is seen since the optical power reaching the optical receiver is much reduced. FIG. 11e shows the data pattern at an $^x$/R ratio of 0.8. The data pattern can still be recovered, but the optical signal level at the optical receiver 7 is now very low and significant noise is present. The optimum $^x$/R ratio, for a singlemode fibre with a core diameter of 9 $\mu$m launching 1.3 $\mu$m radiation into a multimode fibre having a core diameter of 62.5 $\mu$m, is approximately 0.5.

TABLE 1

Launch power and eye height for different launch offsets

| Offset $^x$/R | Average Launch Power (dBm) | Eye Height (V) |
|---|---|---|
| 0 | −8.69 | 2.5 |
| 0.2 | −8.70 | 2.5 |
| 0.4 | −8.71 | 2.4 |
| 0.6 | −8.86 | ¯0.85 |
| 0.8 | −15.15 | ¯0.05 |

Table 1 shows the average launch power and the eye height for each of the $^x$/R ratios. From this it can be seen that significant loss is suffered at $^x$/R of 0.6 and 0.8. This is thought to be because the spot from the singlemode fibre 2 illuminating the end face of the multimode fibre 6 is too close to the edge of the core of the multimode fibre 6, causing lossy higher order modes, or cladding modes to be excited in the multimode fibre 6. However, at an $^X$/R ratio of 0.4 an extremely good eye diagram is received over 2.2 km of multimode fibre at 1.0625 GBit/s, and very little additional loss is suffered compared to a conventional centre launch ($^X$/R=0).

In the second embodiment, a launch offset is achieved in the duplex adaptor 106—the alignment between the single mode fibre 111 in the patchcord and the installed multimode fibre 108 is such that light is launched into the multimode fibre under an offset condition as described above. This serves to prevent bandwidth collapse as indicated in International Patent Application Publication No. 97/33390. However, manufacturing tolerances are such that it is difficult at present to produce adaptors which will achieve the necessary degree of alignment reliably. Consequently, a third embodiment of the invention is provided which achieves the offset launch condition reliably through active control of the alignment process. This embodiment is described with reference to FIGS. 8 to 11.

Figure 8:
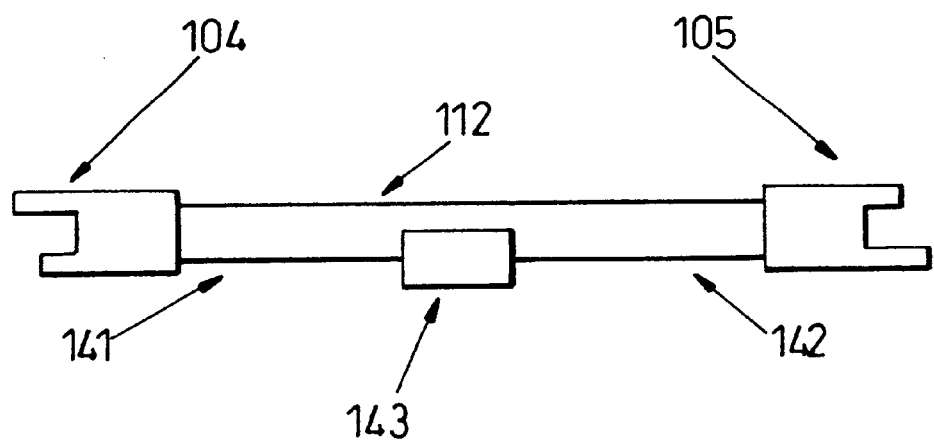
FIG. 8 shows a schematic block diagram showing an optical assembly for connecting a transceiver to an installed fibre of an optical communications system, all according to an arrangement in accordance with a third embodiment of the present invention.

The overall arrangement is shown in FIG. 8. The arrangement of FIG. 8 differs from that of FIG. 1 in that the length of single mode fibre on the transmission side is replaced by a composite arrangement comprising a length of single mode fibre 141 for receiving light from the transmitter, a length of multimode fibre 142 for providing connection to the installed multimode fibre, and a connection means 143 between the single mode fibre and the multimode fibre. The connection means is used to achieve an offset launch from the single mode fibre 141 into the multimode fibre 142 according to the criteria described above.

It should be noted that in a preferred version of this embodiment of the invention, the length of single mode fibre 141 is sufficient that substantially single mode light is provided at the: connection means 143 for illumination of the end of the multimode fibre length 142. The length of single mode fibre required for substantially single mode light to result in this arrangement (given a conventional single mode laser as light source) is approximately 10 mm. Although, versions of this third embodiment could be provided with less than this length of single mode fibre, such versions are not preferred as they will be more difficult to produce and will not have the advantageous property of providing a well-understood launch into multimode fibre.

Figure 9:
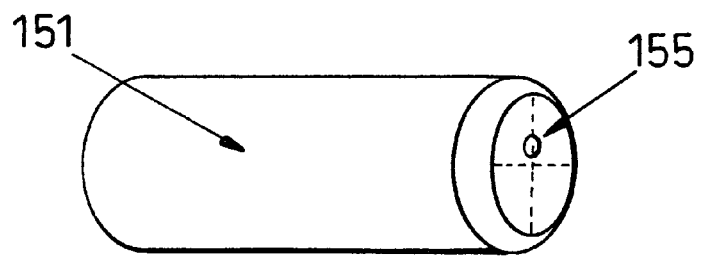
FIG. 9 shows a ferrule adapted for use in the optical assembly of FIG. 8.
Figure 10:
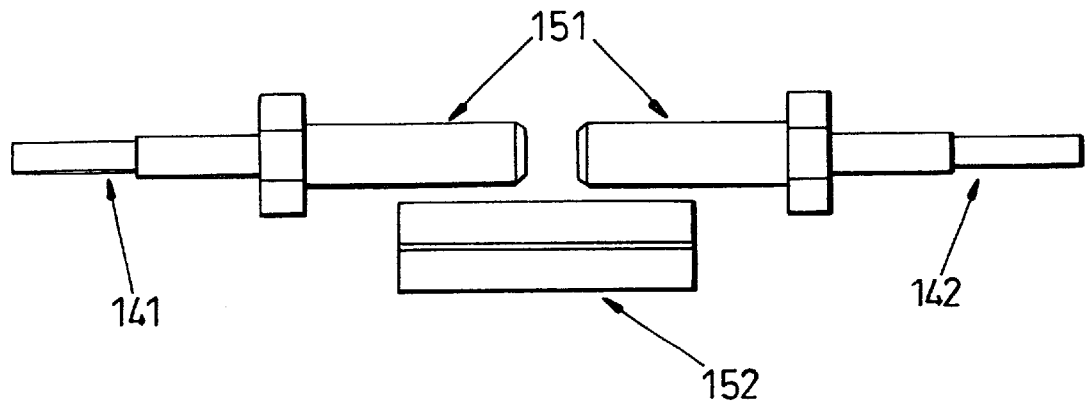
FIG. 10 shows the components of the optical assembly of FIG. 8.

FIGS. 9 and 10 illustrate how active control of the offset launch from the single mode fibre length to the multimode fibre length can be achieved. Each fibre length is terminated with a ferrule 151 in which the fibre end is offset. The offset hole 155 is shown in FIG. 9. The centre of the fibre is offset from the centre of the ferrule 151 by a predetermined amount—this s amount is not critical, as will be indicated below, but a suitable amount for launch into a typical 50 or 62.5 µm multimode fibre is approximately 15 µm. The normal to the optical fibre face at the offset hole is parallel to the ferrule axis. The construction of such a ferrule with an offset fibre is straightforward: the fibre face is formed parallel with the ferrule face by polishing.

As is shown in FIG. 10, the ferrules 151 are aligned to each other with a split sleeve 152. As the offset holes 155 in each ferrule 151 are provided at equal offsets from the centre of the ferrule axis, the two fibres 141, 142 could if desired be precisely aligned. However, it is also possible by controlled rotation of the fibres to achieve a controlled offset between the two fibres. The distance by which the fibres need to be offset from the ferrule axis is therefore dependent on how fine a control of the relative rotation of the fibres can be achieved. The precise alignment is then achieved by relative rotation of the fibre ferrules and concurrently measuring the resulting output from the multimode fibre.

To ensure the correct offset, the coupled power ratio (CPR) can be measured at the output of the multimode fibre 142 (a qualitative measure can be obtained by observation of the nearfield, as the man skilled in the art will appreciate). The coupled power ratio is defined in the TIA/EIA standard TIA/EIA OFSTP-14A "Optical power loss measurements of installed L multimode fiber cable plant", currently available in draft form—this is also referenced in the Gigabit Ethernet standard IEFE 802.3z. In essence, the CPR is a measure of how much the light fills the centre of the core of the multimode fibre relative to the whole fibre core. The power coupled out of the multimode fibre into a single mode fibre is measured, and this is compared with the power coupled out of the multimode fibre into a similar multimode fibre. The difference between the powers is the CPR. High CPR indicates that there is little light at the centre of the fibre, whereas low CPR indicates that there is a lot of light at the centre of the fibre. The measure is an appropriate one, as to prevent bandwidth collapse it is desired to avoid exciting low order modes which reside at the centre of the fibre and to rather excite mid order modes which have a much lower residence at the centre of the fibre. Suitable values for specific multimode fibres are shown in Table 2 below, together with the offsets between fibres generally necessary to achieve these CPR values. These measurements are taken on the patchcord fibres, but the CPR value is still a useful measure of the performance of the system as a whole, as the mode distribution will propagate relatively consistently from one multimode fibre to another across a connector. The values are also dependent on the working wavelength of the communication system: the values below are determined for 1300 nm (however, it is quite possible to determine values for other wavelengths of interest, such as 850 nm).

TABLE 2

| Offset requirements for installed multimode fibre | | |
|---|---|---|
| Wavelength/fibre type | Offset (µm) | CPR (dB) |
| 1300 nm/62 MMF | 17–23 µm | 28–40 dB |
| 1300 nm/50 MMF | 10–16 µm | 12–20 dB |

Once it has been determined that an appropriate offset between the fibre lengths has been achieved, such as by measuring CPR as above, then the relative position of the ferrules is fixed. This may be by bonding the ferrules 151 and the split sleeve 152 together into one unit with epoxy resin. The whole ferrule assembly is then encapsulated to protect it—in addition, an appropriate conventional strain relief element is provided to prevent any strain effects on the connection between the single mode fibre length and the multimode fibre length to preserve the integrity of the offset launch.

Figure 11:
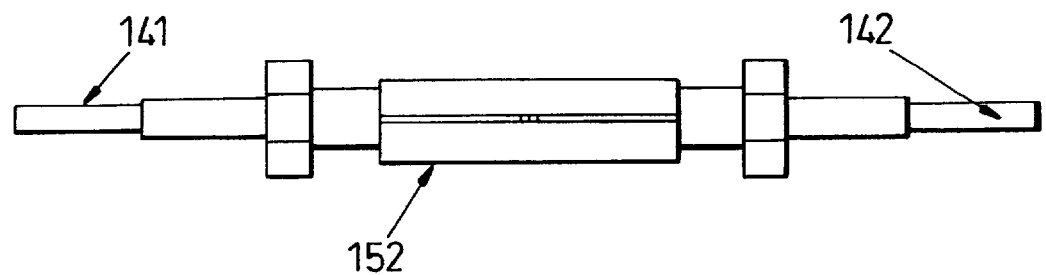
FIG. 11 shows the optical assembly of FIG. 8 as assembled.

It should be noted that it is not essential to use the approach shown in FIGS. 9 to 11 to achieve an embodiment of the invention of the type shown in FIG. 8. Alternative means can be employed to form an effective offset launch connection 143 between the single mode fibre length 141 and the multimode fibre length 142. One suitable alternative solution is to fusion splice single mode fibre length 141 and multimode fibre length 142 together.

It should also be noted that the arrangement of FIG. 8 can be provided advantageously even where no offset launch is achieved at the connection 143. If the single mode fibre length 141 is sufficiently long that substantially single mode radiation is provided at the connection 143, then the advantages of the first embodiment (well understood launch into multimode fibre) are achieved with the added benefit that the relative positions of the single mode and the multimode fibres across the launch can be fixed very accurately as they are established during the fabrication of the patchcord and are shielded from changes thereafter.

It should be noted that the present invention is not limited to the duplex arrangement shown in the Figures. It could be used in the context of a composite arrangement with a larger number of fibre connections required.

A significant feature of embodiments according to the invention is their ease of use by end users, who may not be aware of the considerations required in connecting fibres, or, indeed, of the types of fibre present in their LAN. All that is required of the user is to connect together identified components, the keying assuring that only one connection orientation is possible.

The first embodiment of the invention will function even if the installed fibre has been misidentified, and is single mode rather than multimode fibre. In this case, the launch from the patchcord to the first installed fibre is single mode to single mode, and the coupling from second installed fibre is single mode to multimode—with appropriate design, satisfactory bandwidth can be provided for the first connection and low loss for the second connection with this arrangement.

What is claimed is:

1. A method of constructing a connection apparatus for connecting an optical transceiver to multimode optical fibre in a multimode optical fibre system, comprising:

providing a length of single mode fibre terminating in a first ferrule, and providing a length of multimode fibre terminating in a second ferrule, wherein the wherein the second ferrule and the first ferrule are coaxial, wherein the single mode fibre and the multimode fibre are each mounted within the first ferrule and the second ferrule respectively such that the axis of each fibre is offset from the axis of the ferrule;

rotating the first ferrule with respect to the second ferrule such that the single mode fibre is offset from the launch multimode fibre, measuring an output property of light from the multimode fibre, and fixing the first ferrule with respect to the second ferrule when a satisfactory value of the output property is achieved;

providing a further length of multimode fibre, and adding connectors to the fibres, such that a first fibre path comprising the length of single mode fibre and the length of multimode fibre is formed for connection between a source of an optical transceiver and a first fibre of a multimode fibre network, and such that a second fibre path comprising the further length of multimode fibre is formed for connection between a receiver of the optical transceiver and a second fibre of the multimode fibre network.

2. A method as claimed in claim 1, wherein the step of measuring an output property comprises measuring a coupled power ratio into the multimode fibre.

* * * * *